United States Patent [19]

Smith et al.

[11] Patent Number: 4,954,040

[45] Date of Patent: Sep. 4, 1990

[54] REFUSE TRUCK BODY HAVING LOAD CARRYING EJECTOR ASSEMBLY

[75] Inventors: Fred T. Smith; Fred P. Smith, both of Palos Verdes Peninsula, Calif.

[73] Assignee: The Heil Co., Milwaukee, Wis.

[21] Appl. No.: 322,999

[22] Filed: Mar. 14, 1989

[51] Int. Cl.[5] .......................... B65F 3/00; B62D 23/00

[52] U.S. Cl. .................................... 414/513; 414/517; 414/525.3; 414/525.6

[58] Field of Search ............... 414/509, 511, 513, 514, 414/516, 517, 525.1, 525.2, 525.3, 525.6

[56] References Cited

U.S. PATENT DOCUMENTS

| | | | |
|---|---|---|---|
| 2,179,726 | 11/1939 | Lewis et al. | 414/513 |
| 2,408,284 | 9/1946 | Anthony et al. | 414/516 |
| 2,480,527 | 8/1949 | Wachter | 414/516 |
| 2,557,003 | 6/1951 | Laurin | 414/513 |
| 2,889,944 | 6/1959 | Clark et al. | 414/509 |
| 3,148,786 | 9/1964 | Boeck et al. | 414/516 X |
| 3,257,012 | 6/1966 | Berolzheimer | 414/513 |
| 3,486,646 | 12/1969 | O'Brien et al. | 414/513 |
| 3,901,394 | 8/1975 | Bowles | 414/525.6 X |
| 4,013,181 | 3/1977 | Johnson | 414/525.6 X |
| 4,067,466 | 1/1978 | Parks et al. | 414/509 |
| 4,096,956 | 6/1978 | Gaskin | 414/525.6 X |
| 4,260,317 | 4/1981 | Martin et al. | 414/517 |
| 4,382,740 | 5/1983 | Smith | 414/517 X |
| 4,475,862 | 10/1984 | Paulsson et al. | 414/513 |
| 4,557,658 | 12/1985 | Lutz | 414/517 |
| 4,576,540 | 3/1986 | Derain et al. | 414/517 X |
| 4,775,283 | 10/1988 | Krapp et al. | 414/517 X |

FOREIGN PATENT DOCUMENTS

| | | | |
|---|---|---|---|
| 12227 | 6/1980 | European Pat. Off. | 414/513 |
| 295574 | 12/1988 | European Pat. Off. | 414/525.6 |
| 218331 | 2/1985 | Fed. Rep. of Germany | 414/525.6 |
| 129729 | 10/1950 | Sweden | 414/525.3 |
| 274057 | 9/1970 | U.S.S.R. | 414/517 |
| WO/82/006-27 | 3/1982 | World Int. Prop. O. | 414/517 |

OTHER PUBLICATIONS

Pack-Mor Manufacturing Company, Refuse Collection Units, 1954, Pertinent pp. 2,3,4, and 10.

*Primary Examiner*—Robert J. Spar
*Assistant Examiner*—Robert S. Katz
*Attorney, Agent, or Firm*—Paul R. Puerner

[57] ABSTRACT

A refuse truck body for attachment to a "low entry cab chassis". This truck body includes a container having an open forward end and an open rearward end. A tailgate or cap is provided for releasably closing the open rearward end. The container further includes an ejector assembly mounted for longitudinal movement within the container. The assembly is moved between a retracted position near the front of the truck and an ejection position near the rear of the truck by a linear actuator mounted generally horizontally above the ejector assembly. The ejector assembly has triangular side panels and an upwardly forwardly inclined ejection panel which reaches partially underneath the refuse, thus allowing the load of refuse to be carried forward of the container proper, to distribute more of the load onto the front wheels.

4 Claims, 3 Drawing Sheets

26a
24
26
74
5
5
30
26a
54c
74
60
70
70
58
74
56
54b
64
66
68
54
54a
62

REFUSE TRUCK BODY HAVING LOAD CARRYING EJECTOR ASSEMBLY

BACKGROUND OF THE INVENTION

This invention relates to body configurations for refuse trucks, and in particular to apparatus for ejecting the refuse collected into refuse trucks.

It is common for a refuse truck to include a panel, hydraulically or otherwise activated, for ejecting the refuse from the truck. Generally, this panel is simply a flat vertically oriented panel, resting at one end of the truck body, and a hydraulic cylinder is provided for moving the panel toward the opposite end of the truck body. That hydraulic cylinder is generally oriented diagonally, as shown in FIG. 1, or horizontally, as shown in FIG. 2, thus wasting substantial room within the truck body which could be better put to use by carrying increased load.

This invention relates to improvements to the apparatus described above and to solutions to the problems raised thereby.

SUMMARY OF THE INVENTION

The invention applies to a refuse collection truck having front and rear wheels and a cab positioned entirely forward of at least a portion of the front wheels, a so-called "low entry cab chassis". The truck has mounted thereon a body adapted to receive and compress refuse. This truck body includes a container having an open forward end and an open rearward end. A tailgate or cap is provided for releasably closing the open rearward end, which may also compact the refuse contained within the truck body. The container further includes an ejector assembly mounted for longitudinal movement within the container. The assembly is movable between a retracted position near the front of the truck and an eject position near the rear of the truck. The ejector assembly has triangular side panels and an upwardly forwardly inclined ejection panel which reaches partially underneath the refuse, thus allowing the refuse to be carried forward of the front of the container, or body proper, to distribute more of the load onto the front wheels. A linear actuator, such as a hydraulic cylinder, is mounted horizontally above the ejector assembly, and may be located and partially above the cab. The cylinder is provided for moving the ejector assembly longitudinally within the container.

Other objects and advantages of the invention will become apparent hereinafter.

DESCRIPTION OF THE PREFERRED EMBODIMENT

Figure 3:
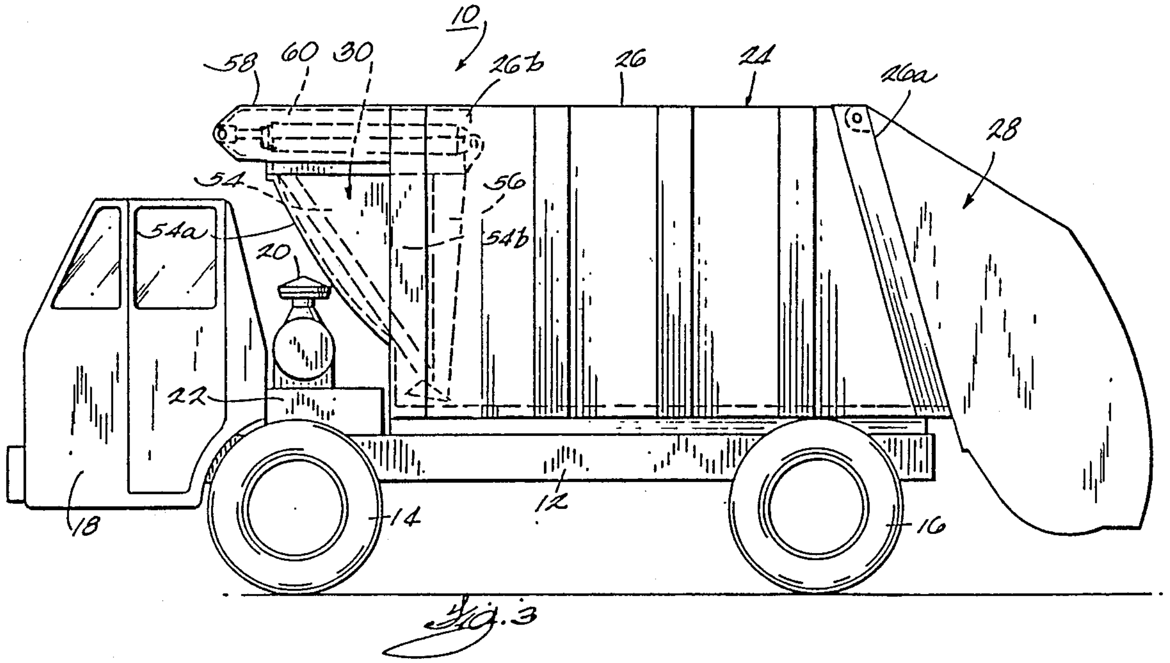
FIG. 3 is a side view of a refuse truck having an ejector assembly constructed according to one embodiment of the invention in a retracted position.

Referring now to FIG. 3, there is shown a refuse truck 10 of a "low entry cab" configuration. That is, the refuse truck 10 includes a chassis 12 having at least two front wheels 14 and two rear wheels 16, and a cab 18 which is located entirely forward of at least part of the front wheels.

Figure 6:
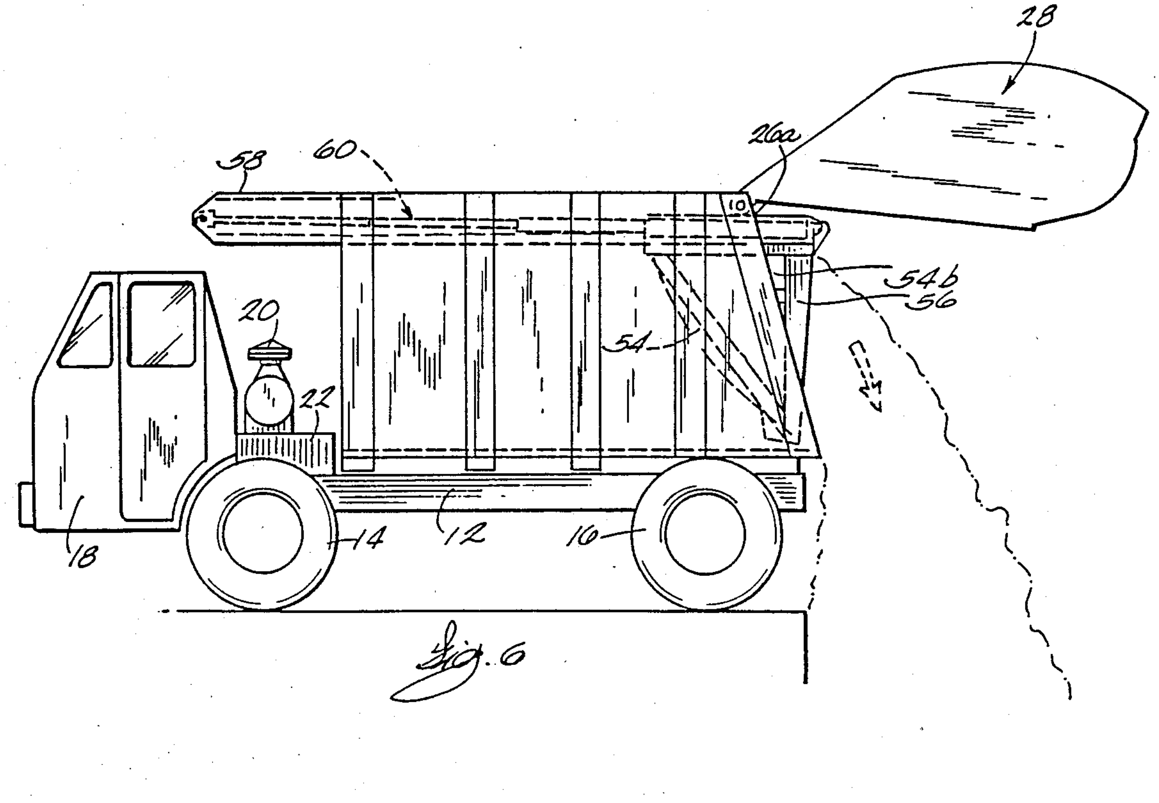
FIG. 6 is a side view of a refuse truck having an ejector assembly the same as that shown in FIG. 3, showing the ejector assembly in its ejection position.

Generally in a low entry cab chassis such as the one shown here, an air cleaner 20 and transmission 22 are located just behind the cab 18, as shown. A refuse body 24 is mounted on the chassis 12, just behind the transmission 22. The refuse body 24 includes a container 26 which is open at each end. The rearward end 26*a* is closed conventionally by a closable tailgate apparatus 28, which may conventionally include other apparatus such as devices (not shown) for dumping refuse containers, and devices for compacting the refuse, as disclosed in U.S. Pat. No. 4,690,607, assigned to the assignee of the present invention. Generally, when the refuse body 24 is to be emptied, this tailgate 28 is opened as shown in FIG. 6 and the refuse is forced out of the container 26 by an ejector 30.

The portions of the refuse body 24 set forth up to this point are generally conventional. However, as can be seen by reference to FIGS. 1 and 2, the prior art trucks shown have had ejector panel assemblies which took up space within the respective container, thereby reducing the effective load capacity of the container and hence the truck. That is, referring now to FIG. 1, the refuse truck 32 shown there had an ejector 34 positioned inside the container portion 36 of the truck body 38. This ejector 34 was actuated by one or more hydraulic cylinders 40 arranged diagonally within the truck body 38. The ejector 34 itself presented a diagonal front face 34*a* to the refuse inside the truck body 38, so as to provide maximum room within the body considering the position of the cylinders 40.

Figure 1:
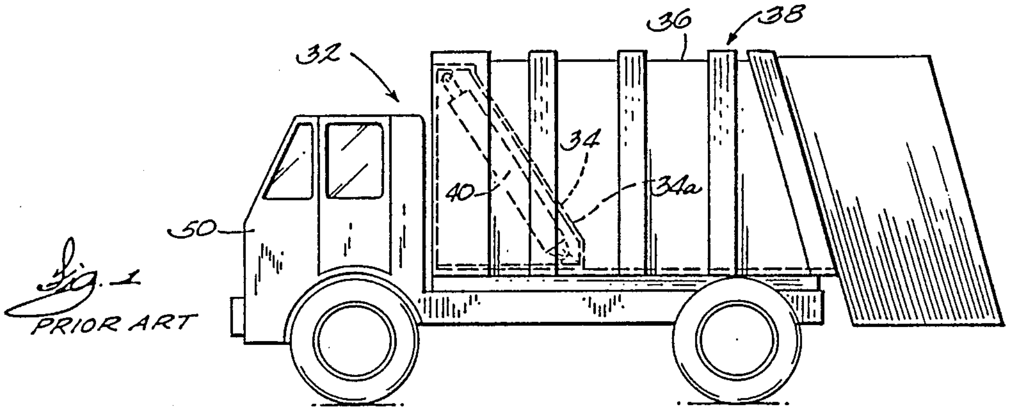
Fig. 1 PRIOR ART
FIG. 1 is a side cross-sectional view of a prior art refuse truck body having an ejector assembly with a diagonal cylinder.
Figure 2:
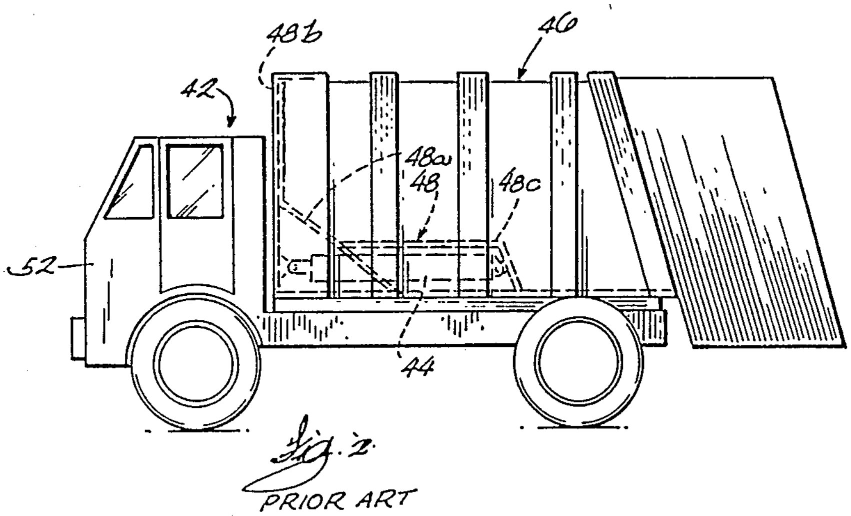
Fig. 2 PRIOR ART
FIG. 2 is a side cross-sectional view of a prior art refuse truck body having an ejector assembly with a horizontal cylinder positioned along the bottom of the body.

An improvement to the truck body 38 shown in FIG. 1 is illustrated in FIG. 2. In that prior art design for a refuse truck 42, one or more cylinders 44 were positioned flat on the floor of the body 46. The cylinders 44 were connected to and moved an ejector 48 which was clearly shaped much more efficiently, having only a small diagonal portion 48*a* near the front of the body 46, a vertical portion 48*b* adjacent the front and a long but very low cylinder cover portion positioned over the cylinder 44 itself. While this ejector 48 did take up less space within the truck body 46 than did the ejector 34 shown in FIG. 1, allowing for relatively more usable load carrying space therein, it still took some space out of the body 46 that would have been better used carrying refuse. The embodiment shown in FIG. 2 also had the disadvantage that refuse may tend to hang up on the first surface over the cylinder, sometimes referred to as the "doghouse". Further, the cabs 50 and 52 respectively of the truck 32 shown in FIG. 1 and the truck 42 shown in FIG. 2 were of the conventional type, with the body 38 and 46 in each case having a vertical front end which butts up against the cab, and the cab has a corresponding vertical rear surface. When a chassis 12 having a low entry cab 18 is used as is the case in the present invention, as shown in FIG. 3, there is space forward of the front of a conventional body and above the air cleaner 20 and transmission 22 of the subject truck chassis which would not be put to use, that is, would be wasted, by simply attaching a conventional body to that chassis.

Figure 4:
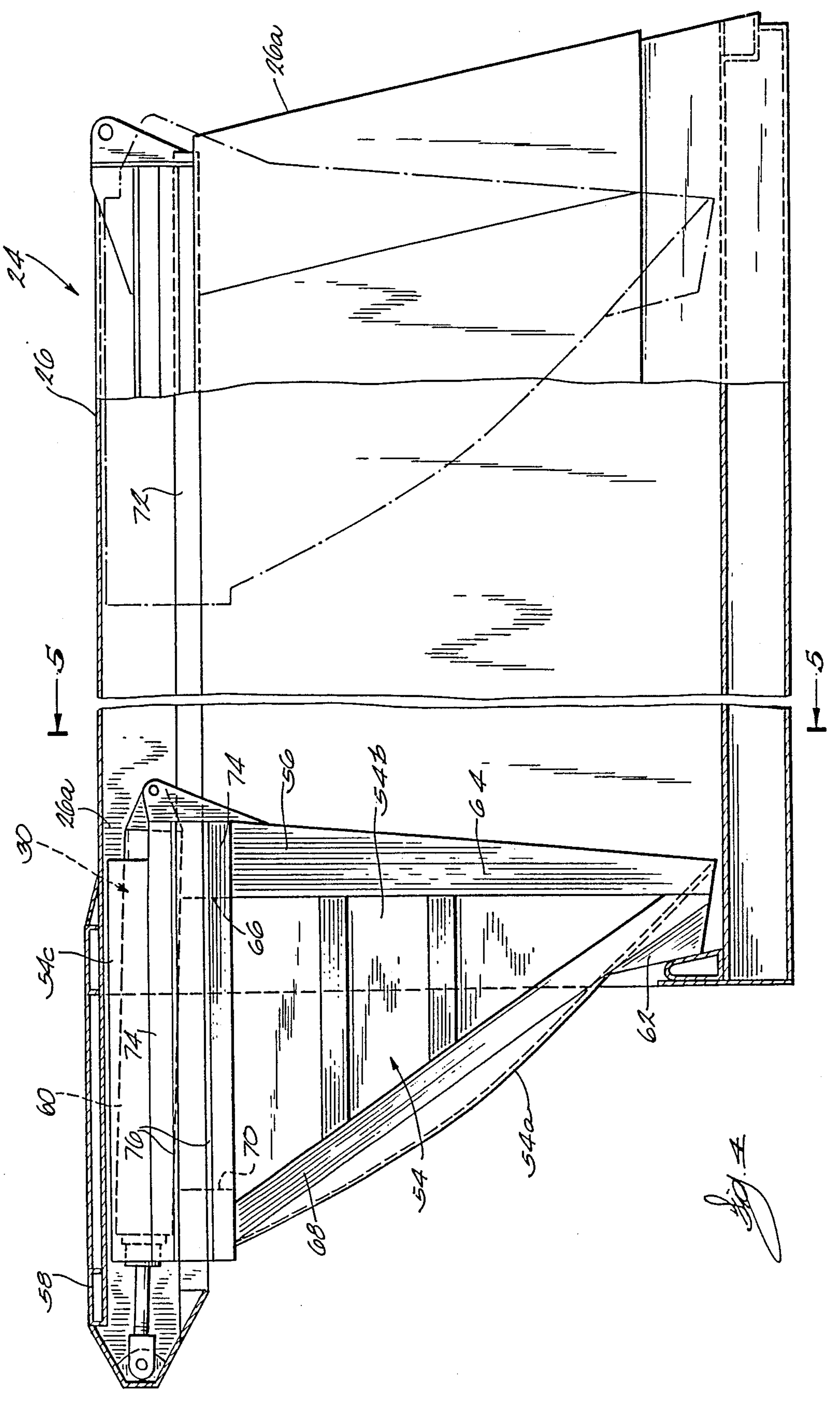
FIG. 4 is an enlarged side view of the ejector assembly and certain associated apparatus as shown in FIG. 3, partially in section, showing the ejector assembly in its retracted position, and in phantom in its ejection position.
Figure 5:
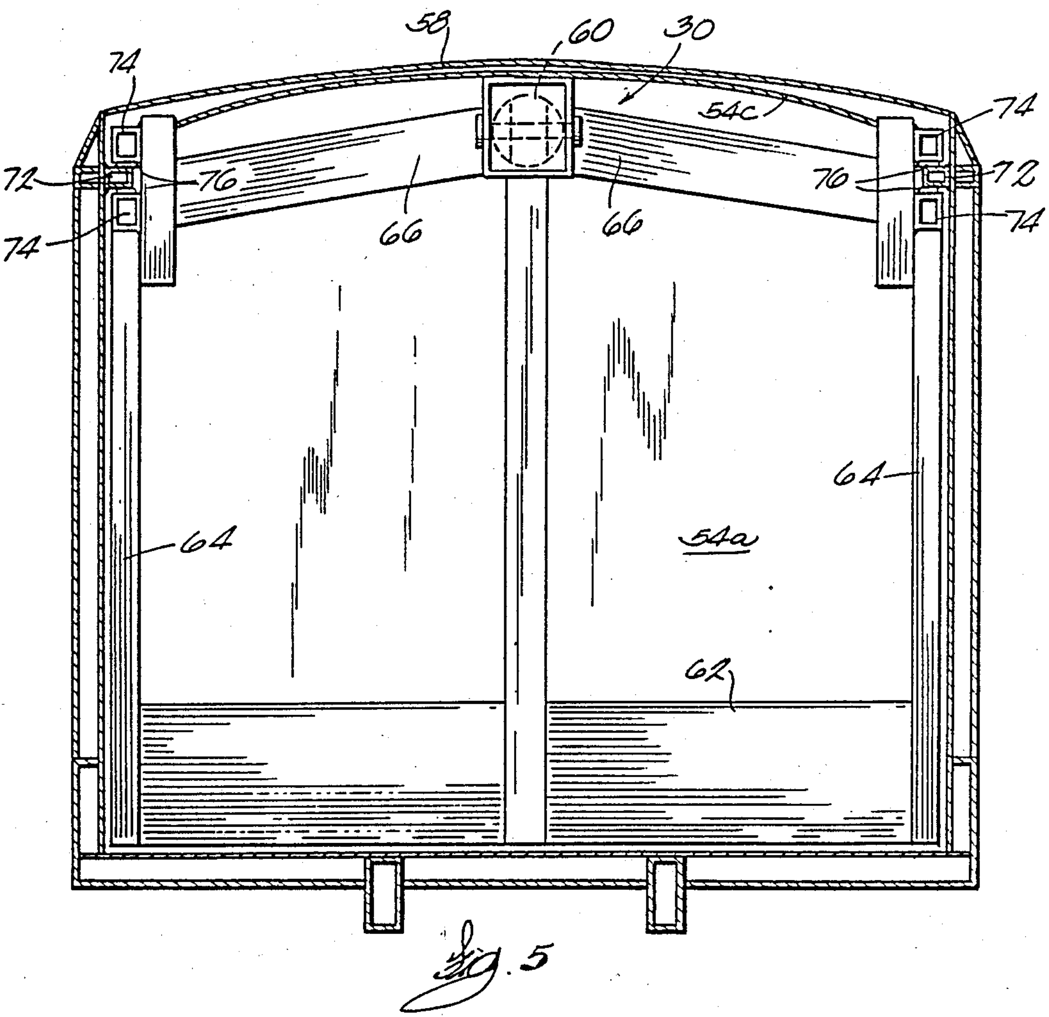
FIG. 5 is a cross-sectional view of FIG. 4, taken along line 5—5 thereof.

Referring now to FIGS. 3, 4 and 5, the body 24 constructed according to the invention includes an ejector 30, referred to in general terms above. In the preferred embodiment of the present invention, this ejector 30 includes an ejector assembly 54 which is moved between a retracted position, shown in FIG. 3, and an ejection position adjacent the rearward end 26*a* of the refuse container portion 26 of the body 24, as shown in FIG. 6 and in phantom in FIG. 4. The ejector assembly 54 has triangular side panels and an upwardly forwardly inclined ejection panel which reaches partially underneath the refuse. Accordingly, the assembly 54 includes a lower diagonal portion 54*a* as its forwardmost end. The ejector assembly 54 includes triangular closed side panels 54*b*, one on each side, and a top panel 54*c*. A panel support frame 56 is provided to give support and rigidity to the ejector assembly 54. The panel support frame 56 includes a bottom bar 62, a pair of rear side members 64 and a rear top bar 66, connected together to form, generally, a rectangle. The panel support frame 56 further includes a pair of front side members 68, which angle from their connection at their lower ends to the bottom bar 62, forward and upward to a connection at their upper ends to a front top bar 70. Front top bar 70 is connected to rear top bar 66 by the top panel 54*c*, which acts as a web to which the two top bars correspondingly act as flanges, resulting in improved strength.

The body 24 is constructed with a set of tracks 72, which run the length of the body, along the tops of both inside sides of the body. Correspondingly, there are bearing means, such as shoes 74, at each end of each top bar 66 and 70, which shoes bear on and run or are movable along the respective track 72. By means of these shoes 74 and tracks 72, the ejector assembly 54 is moveable lengthwise within the body 24. The positioning of these shoes 74 and tracks 72 at the top of the body 24 and ejector assembly 54 reduces the instance of abrasion and wear caused by any abrasive materials which may be found in the refuse, since the shoes and tracks are raised generally out reach of the refuse.

An actuator support frame 58 is attached to the top front end 24*a* of the body 24. This actuator support frame extends generally horizontally forward of the body 24, and may even extend partly over the cab 18 in some instances. To the forwardmost end of actuator support frame 58 is pivotably attached one end of at least one linear actuator 60, which may be a hydraulic cylinder. The opposite end of the actuator 60 is attached to panel support frame 56. Thus actuating the actuator 60 provides the power to move the ejector assembly 54 from its retracted position to its ejection position, effectively ejecting the refuse from the container 26. Actuating the actuator 60 in the reverse direction then returns the ejector assembly 54 to its retracted position.

In its retracted position, as can be seen by comparing FIGS. 3 and 4 to FIGS. 1 and 2, the ejector assembly 54 of the present invention not only does not take up space within the container 26, but actually effectively increases the size of the container over that provided by prior art refuse bodies, clearly a desirable effect. Further, an ejector assembly constructed according to the invention provides more even distribution of the refuse load when used with the low entry cab chassis, distributing more of the weight of the load onto the front wheels, another clearly desirable effect. Another advantage of the use of an ejector assembly constructed according to the invention is that the space above the transmission, air cleaner and engine may be used to carry refuse when the truck is in use, and when maintenance is necessary on the truck, the engine, air cleaner and transmission may be easily accessed without the need to raise the body, by moving the ejector assembly rearward a few feet.

While the apparatus hereinbefore described is effectively adapted to fulfill the aforesaid objects, it is to be understood that the invention is not intended to be limited to the specific preferred embodiment of refuse truck body having load carrying ejector assembly set forth above. Rather, it is to be taken as including all reasonable equivalents within the scope of the following claims.

I claim:

1. In a refuse collection truck having front and rear wheels, and a cab positioned entirely forward of at least a portion of the front wheels, a truck body adapted to receive and compress refuse, comprising:

- a container having an open forward end and an open rearward end, said forward end being located rearward of the front wheels and said rearward end being open for loading refuse into and discharging refuse from said container;
- a tailgate for releasably closing said open rearward end;
- an ejector assembly mounted for longitudinal movement within the container between a retracted position over at least a portion of the front wheels and an ejection position nearer the rear of the truck, said ejector assembly having triangular side panels and an upwardly forwardly inclined ejection panel, such that a portion of said ejection panel is positioned simultaneously underneath part of the refuse and over said portion of the front wheels, thus allowing at least a portion of the refuse to rest forward of said forward end of said container and partially over the front wheels; and
- a linear actuator mounted horizontally above said ejector assembly and the front wheels, for moving said ejector assembly longitudinally within said container.

2. Apparatus as recited in claim 1 further comprising means for permitting relative movement between said ejector assembly and said container, including track means mounted to the top inside of said container, and bearing means mounted on said ejector assembly and movable along said track means.

3. Apparatus for use in connection with a refuse collection container for transporting a load of refuse, said container generally permanently mounted on a refuse truck having a cab at its front end and having front and rear wheels, and said container having an open forward end and an open rearward end, said forward end positioned rearward of the front wheels side panels and an upwardly forwardly inclined ejection panel, said apparatus comprising;

- a tailgate for releasably closing said open rearward end of said container;
- an ejector assembly mounted for longitudinal movement between a retraction position over at least a portion of the front wheels and an ejection position ajacent the rearward end of the container, said ejector assembly having triangular side panels and an upwardly inclined ejection panel, such that, in its retraction position said ejection panel is simultaneously positioned partially underneath the load and over said portion of the front wheels, permitting at least a portion of the load to rest forward of said forward end of said container; and a power means positioned forward of said container for moving said ejector assembly longitudinally within said container between said retraction position and said ejection postion.

4. Apparatus as recited in claim 3 further comprising means for permitting relative movement between said ejector assembly and said container, including track means mounted to the top inside of said container, and bearing means mounted on said ejector assembly and movable along said track means.

* * * * *